United States Patent [19]
Kawai

[11] 3,802,750
[45] Apr. 9, 1974

[54] LOAD-SENSING AND INSTRUCTION-TRANSMITTING MECHANISM FOR COOPERATION WITH A HYDRAULIC WHEEL BRAKE SYSTEM OF A POWERED VEHICLE

[75] Inventor: Sinji Kawai, Toyota, Japan
[73] Assignee: Aisin Seiki Company Limited, Toyota-shi, Aichi-ken, Japan
[22] Filed: Sept. 15, 1972
[21] Appl. No.: 289,476

Related U.S. Application Data
[63] Continuation of Ser. No. 889,637, Dec. 31, 1969, abandoned.

[52] U.S. Cl. .................. 303/22 R, 188/195
[51] Int. Cl. .......................... B60t 8/18
[58] Field of Search .................. 180/100–102; 188/195, 349; 303/6 C, 22 R, 22 A, 23 R

[56] References Cited
UNITED STATES PATENTS
3,329,471  7/1967  Oberthur ................ 303/22 R
2,096,487  10/1937  Farmer ................ 303/23 R X
3,506,313  4/1970  Lawson ................ 188/195 X
3,503,657  3/1970  MacDuff ................ 303/22 R

*Primary Examiner*—Milton Buchler
*Assistant Examiner*—Stephen G. Kunin
*Attorney, Agent, or Firm*—Cumpston, Shaw & Stephens

[57] ABSTRACT

A load-sensing and instruction-transmitting spring apparatus adapted for cooperation with a conventional load sensing valve, said spring apparatus comprising a spiral coil as its main part, and a longer arm extending therefrom and kept in cooperation with said load sensing valve, and a shorter spring arm extending from said spiral arm and mounted on rear wheel axle of the vehicle, said spring apparatus providing a smaller elastic coefficient within a first operation range and a larger elastic coefficient within a second operation range of said spring apparatus.

5 Claims, 7 Drawing Figures

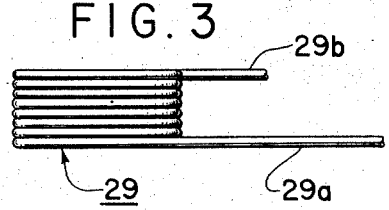
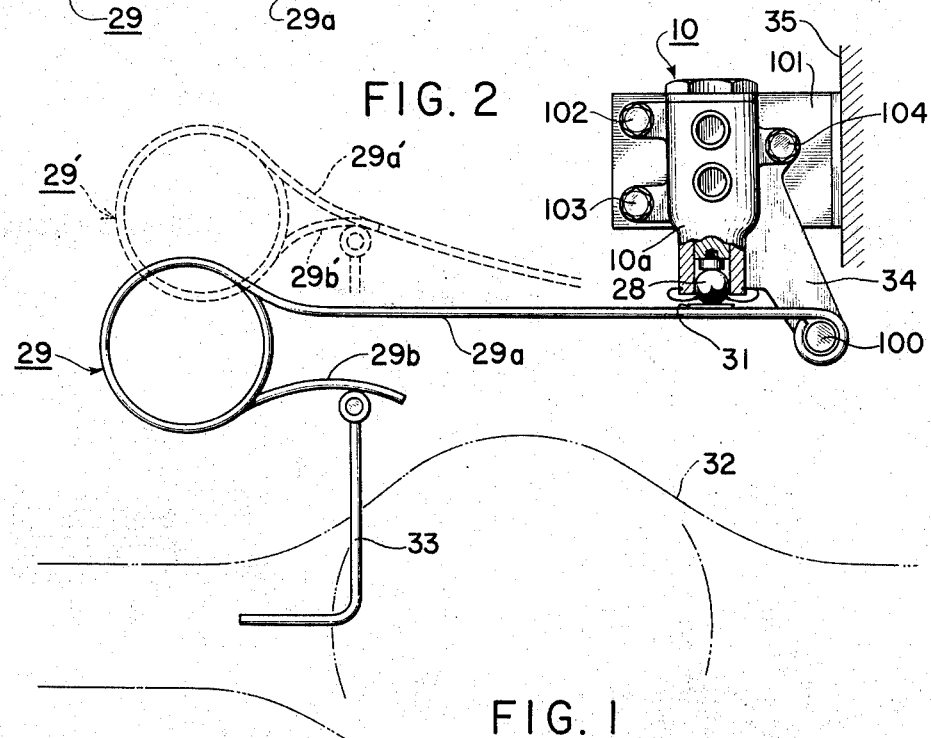
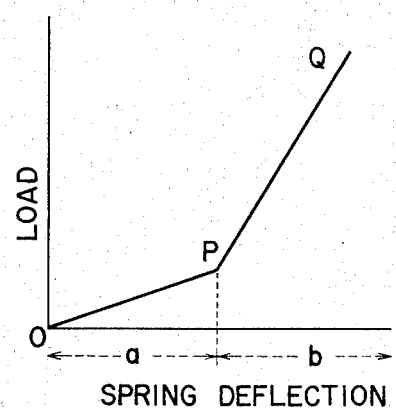
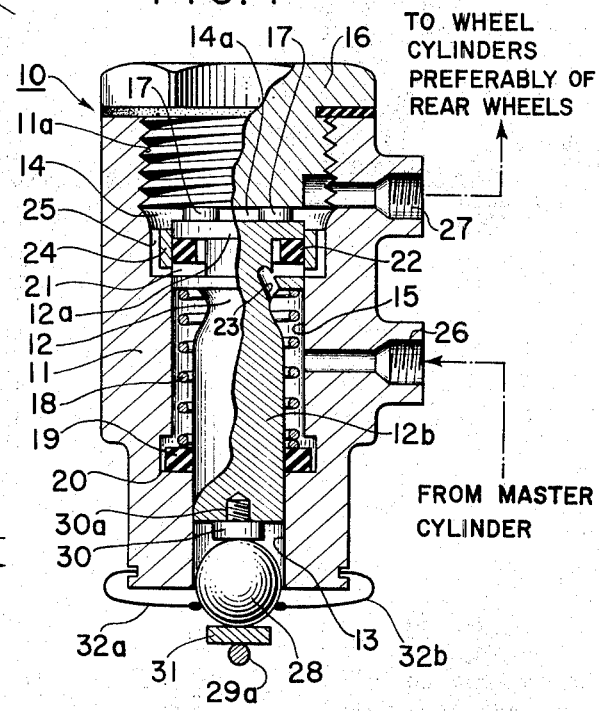

3,802,750

LOAD-SENSING AND INSTRUCTION-TRANSMITTING MECHANISM FOR COOPERATION WITH A HYDRAULIC WHEEL BRAKE SYSTEM OF A POWERED VEHICLE

RELATED APPLICATIONS

This is a continuation of application Ser. No. 889,637, filed Dec. 31, 1969 now abandoned.

This invention relates to improvements in and relating to a mechanism for control of hydraulic brake pressure in a wheel braking system for a powered and wheeled vehicle in response to the variation in the loaded conditions of the vehicle. The hydraulic brake pressure control mechanism of the above kind is generally designed and arranged such that it senses the load variation in terms of the variation in the distance between the vehicle chassis and the wheel axle or the casing thereof, the sensed response being transmitted to a conventional hydraulic brake pressure control unit for the purpose of controlling the latter in response to the occasional variation of the loaded conditions of the vehicle thus sensed and transmitted.

The load sensing valve, known briefly as L.S.V., is used nowadays broadly, said valve being so designed and arranged that it senses occasional variation in the load imposed on the rear wheel means of a powered vehicle, and in terms of the corresponding variation in the distance between the vehicle chassis and the rear wheel axle or its housing, said sensed variation being transmitted to the hydraulic brake pressure control unit for controlling the latter.

A representative mechanism for the transmission of the thus sensed results to the hydraulic brake pressure control unit comprises a compression spring inserted between piston means as a main working member of said control unit, on the one hand, and the vehicle rear axle or the housing thereof, on the other hand. Or alternatively, a lever is utilized for transmitting the wheel load variation in terms of the variable distance between chassis and rear wheel axle. As a still further alternative way, a kind of hydraulic piston and cylinder unit similar to the conventional vehicle shock absorber is utilized, the variation of hydraulic pressure in the absorber cylinder in terms of the occasional wheel load variation being transmitted to the pressure control unit for the same purpose.

There is provided, however, conventional suspension means between the chassis and the wheel axle, as is commonly known, and thus it is highly desirous to sense the wheel load variation in the above sense, taking into account of the characteristic difference of the vehicle suspension means depending upon specifically designed model thereof and to transmit the sensed result precisely to said pressure control unit. Only in this way, the control of the hydraulic brake pressure in function of the wheel load variation can be realized and the rear wheel braking torque is applied in response to the occasional rear wheel loading conditions. In this respect, however, conventional prior load sensing and transmitting mechanisms are far from the ideal and much to be desired in attaining the desirous purpose aimed at.

More specifically, there are different kinds of the practically manufactured model of the vehicle suspension fitted to various kinds of automotive vehicles. Therefore, the variation in the distance between chassis and rear wheel axle under variably loaded conditions of the rear wheel means is considerably different for a certain load imposed thereon, depending upon the model of the vehicle. Thus, the correctly desirous control of hydraulic brake pressure depending upon the occasional variation in the wheel loading conditions must be carried into effect by performing the aforementioned kind of sensing action in conformity to the practical variation in the chassis-rear axle distance, in which the suspension characteristics play an important role. The term "suspension characteristics" means the relationship between specific deformation of the suspension under load and the load under consideration, which characteristics vary with occasionally selected type of the vehicle suspension.

It is the main object of the present invention to provide a load-sensing and transmission mechanism of the kind set forth hereinbefore and capable of functioning in conformity with the suspension characteristics of the occasionally adopted specific model of the vehicle suspension.

A further object is to provide a load-sensing and transmitting mechanism of the above kind capable of easy attachment and detachment, yet representing a highly simplified design and providing nevertheless an accurate performance.

For attaining the aforementioned objects, and starting from a conventional vehicle load-sensing and instruction-transmitting apparatus for cooperation with an automotive hydraulic brake system fitted with hydraulic brake pressure control means operative upon reception of a varying instruction from a vehicle load sensing means depending upon occasional variation of said load, the invention in its broadest aspect resides in that said apparatus comprises spring means provided between the vehicle chassis and the wheel axle meet, said spring means representing an abruptly increasing elastic coefficient as beyond a certain predetermined intermediate point when viewed in the whole range of the operating characteristic curve of said spring means.

These and further objects, features and advantages of the present invention will become more apparent as the description proceeds by reference to the accompanying drawings showing several preferred embodiments of the invention.

In the drawings:

FIG. 1 is a longitudinal section of a hydraulic brake pressure control valve which is employed in each of all the embodiments to be shown.

FIG. 2 is an elevational view of a first embodiment of the invention, wherein, however, several parts are shown in section for clear demonstration of certain inner working parts.

FIG. 3 is a plan view of a coiled spring part which is embodied in the embodiment shown in FIG. 2.

FIG. 7 is a chart showing the overall spring characteristic curve of spring means employed and substantially common to all the foregoing embodiments.

Figure 4:
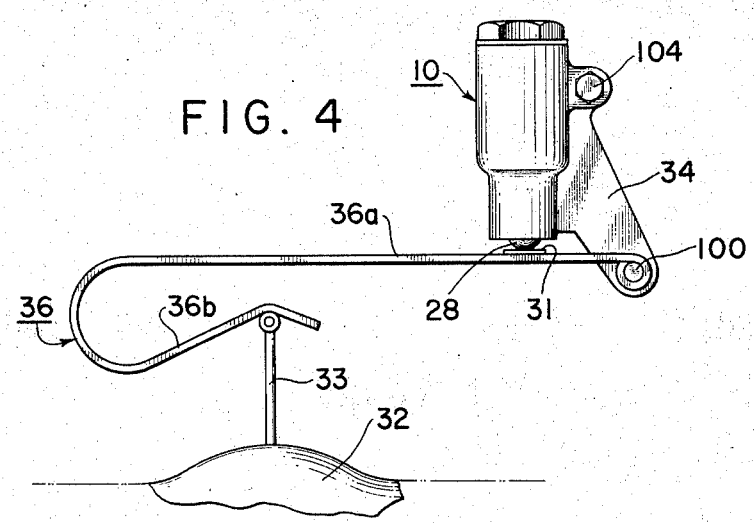
FIGS. 4 and 5 are similar views to FIG. 2, showing preferred second and third embodiments of the invention, respectively.

In advance of the detailed description of several preferred embodiments of the invention, a conventional L.S.V. which cooperates with the load-sensing and instruction-transmitting mechanism will be provisionally described by reference to FIG. 1. It should be, however, noted that the invention is not limitative in the use of the specific L.S.V. shown, but, it is possible to use any modified device so far as the novel teaching of the invention can be applied in the similar sense.

The load-sensing valve unit 10 shown in FIG. 1 comprises a cylinder 11 and a piston 12 which comprises in turn a larger piston part or head 12a and a smaller piston part or skirt 12b made integral therewith, the stepped piston being slidably received in the multi-stepped bore of said cylinder 11, said bore providing a top or larger cylinder chamber 14, an intermediate or medium cylinder chamber 15 and a smallest cylinder chamber 13 which is so demensioned that it receives slidably the piston skirt 12b. The piston head 12a is slidable in the intermediate cylinder space 15. The top or larger cylinder chamber 14 is defined at its upper limit by the lowermost end of a plug member 16, which is kept in threaded engagement with the uppermost or threaded part 11a of the stepped cylinder bore, and at its lower limit by the top end of said piston 12. A plurality of axially extending and radially arranged projections 17 are formed on top of said piston 12, so as to provide a small cylinder space 14a fluidically communicating with the remaining part of said larger cylinder space 14, even when the piston 12 is brought into engagement with the plug member 16 through the intermediary of said projections 17 as shown, under the influence of piston-actuating spring 18 which is positioned within said intermediate cylinder chamber 15 and around the upper half of the piston skirt 12b. The upper end of the spring 18 abuts against the piston head 12a, while the lower end of said spring abuts against a shoulder 20 which defines the intermediate cylinder chamber 15 from the reduced or lower cylinder chamber 13, and indeed, through the intermediary of a resilient sealing ring 19. Piston head 12a is formed with a peripheral groove 21 which receives a resilient ring 22 with considerable radial and axial plays, so as to establish an angular ring space for serving as oil distribution means in fluid cooperation with an inwardly inclined communication passage 23 bored through the material of the piston substantially at the transient zone between the piston head and the piston skirt for establishing a permanent fluid passage between the larger cylinder chamber and the intermediate cylinder chamber. A ring 24 designed and arranged substantially similar to the conventional piston ring is provided as shown, so as to prevent the resilient ring 22 from overdue lateral movement. There is formed a ring space 25 serving as a kind of oil passage between the outer periphery of said ring 24 and the inside wall surface of the larger cylinder space 14.

At a substantially middle level, the main body 10 is formed with a laterally extending oil inlet socket 26 which is hydraulically connected through a piping, not shown, to a conventional master cylinder of the hydraulic vehicle brake system. At a relatively higher level from the inlet socket, there is provided an outlet socket 27 in the similar way which socket is hydraulically connected through a piping, not shown, to a conventional wheel cylinder means, again not shown, for instance those for vehicle rear wheels. As seen, the first socket 26 is kept in fluid communication with the intermediate cylinder chamber 15, while the second socket 27 is kept in communication with the larger cylinder chamber 14. In this way, with the pressure control unit in the shown position in FIG. 1, both inlet and outlet sockets 26 and 27 are kept permanent fluid communication with each other.

At the lowermost end of the piston skirt 12b and at its center, there is provided an upper washer piece 30 which is kept in position by screw 30a and engages a ball 28 as shown, said ball being movable along the lower part of the lower cylinder space 13 which is, however, open at its lower end. This ball 28 projects partially from the cylinder 11 and is prevented from dropping out of said cylinder space 13 by means of a pair of spring retainers 32a and 32b which are fixedly attached to the lower part of said cylinder 11. The ball 28 is resiliently urged to move upward by spring arm 29a through lower washer piece 31 attached thereto fixedly by welding or the like conventional fixing means. As will be seen from the foregoing that the piston 12 is always urged to move upward in FIG. 1 towards the bottom surface of said plug member 16.

In off-service position of the pressure control unit 10 shown in FIG. 1, when a hydraulic brake pressure is conveyed from the master cylinder to inlet socket 26, the pressure is conveyed therefrom through intermediate cylinder chamber 15, communication passage 23 and ring space 25 to larger cylinder chamber 14 thence through outlet socket 27 towards the rear wheel cylinders. Since, as conventionally, pressure oil is conveyed from the master cylinder to front wheel cylinders, not shown, same master cylinder pressure is conveyed to the rear wheel cylinders as the front wheel cylinders. By virtue of the differential design of the piston 12 so far shown and described, the hydraulic pressure prevailing in the unit 10 will act in effect upon the cross-sectional area of piston skirt and in the downward direction. With a successively increased braking manual effort exerted by the vehicle driver, and thus with a correspondingly increased hydraulic pressure conveyed from the master cylinder to the unit 10, the hydraulic pressure acting downwards upon the piston 12 will become gradually increased, thereby at a certain time point during the continued brake application step the effective hydraulic pressure on the piston overcoming the combined mechanical pressure exerted by the urging springs 18 and 29a, so as to move the piston practically in the downward direction, until sealing ring 22 interrupts the hitherto established hydraulic communication between the intermediate cylinder chamber 15 with the larger or top cylinder chamber 14 by closing the communication opening occupying the defining zone between said chambers 14 and 15.

Upon realization of said hydraulic interruption, an upwardly directing hydraulic pressure will act upon the ring-shaped differential piston area provided by the cross-section of the piston head less that of the piston skirt. A combined pressure of this upward hydraulic pressure with the overall spring pressure in the aforementioned sense will be kept at this operational stage in equilibrium with the downwardly directing overall hydraulic pressure on the piston 12. With further increase of manual pressure upon the conventional brake pedal, not shown, exerted manually by the vehicle driver, the hydraulic pressure increase in the top cylinder chamber 14 relative to that in the intermediate chamber 15 will progress in the ratio of said ring piston area relative to the overall cross-sectional area of the piston head 12a. Therefore, the rate of hydraulic pressure increase in the top cylinder chamber 14 is smaller than that in the intermediate cylinder chamber 15. Under these operational conditions, the piston will perform its upward movement again, thus the communication opening between said both cylinder chambers being opened. Thus, a downward movement of the piston will be re-initiated, and so on. From the foregoing description, it will be observed that in the course of a continued and gradually intensified brake applying effort exerted by the vehicle driver through the foot brake pedal, the piston will perform a repeated up-and-down movement. This kind of fluctuating up-and-down movement of the control piston is performed at a considerable high frequency of repetition and in a substantially similar way to a flap of bird's wings. During this full course of the fluctuating up-and-down movement of the piston, the hydraulic pressure prevailing in the top cylinder chamber 14 and thus the hydraulic brake pressure being supplied to the rear wheel cylinders will be more gradually increased with the aforementioned pressure ratio, than that of the hydraulic brake pressure directly supplied from the master cylinder to the front wheel cylinders, not shown.

Upon release of the manual pressure from the foot brake pedal, all the working parts of the pressure control unit 10 will recover their initial position shown in FIG. 1.

As was mentioned hereinabove, the increase ratio of hydraulic brake pressure to the rear wheel cylinders is controlled during brake application in a more gradual manner than in the case of the brake pressure to the front wheel cylinders. It is the main inventive idea to be realized according to this application by modifying the spring constant of said spring such as at 29a in a stepped mode for modifying the initiating time point of the above-kind of fluctuating up-and-down movement and the operating pressure of the pressure control piston, so as to adapt the pressure control unit as at 10 to the occasional variation in the vehicle load. More specifically, it is a specific object of the invention to provide an improved load-sensing and instruction-transmitting means in cooperation with the pressure control piston in a highly adapted manner for the occasional and various operational characteristics of the chassis suspension mechanism fitted to a specific vehicle. In this way, an optimum hydraulic brake pressure control can be realized so as to meet occasional and frequently encountered variations in the vehicle load conditions, as will be more fully described hereinbelow.

Referring now to FIGS. 2 to 5, the numeral 32 denotes schematically and only partially expressed in dash-dotted lines a conventional differential gear casing of an automotive vehicle, a rest or support member 33 being fixedly mounted with its one end on said casing by means of any conventional fixing means, such as welding, screwing, bolting or the like, although not specifically shown. Said supporting member 33 is formed preferably into an elongated rigid bar or the like as shown, although this configuration is not limitative for the invention.

In the first embodiment shown in FIGS. 2 and 3, there is provided a coiled spring 29 having long arm 29a and short arm 29b, the latter spring arm being supported at its outer end on the free end of said supporting member 33.

The outer end of longer spring arm 29a is pivotably connected at 100 with the free end of a stationary arm 34 extending from the main body 10a of the pressure control valve unit 10, the design and the purpose of the provision of which has been fully described hereinbefore with reference to FIG. 1. At an intermediate point of the spring arm 29a in proximity of its pivoted end, the arm is kept always in pressure contact with said ball 28. The valve body 10a is fixedly mounted by means of a plurality of fixing bolts 102 – 104 on a bracket 101, the latter being fixedly attached to the chassis of the vehicle, although the fixing means serving for this purpose being not shown only for simplicity of the drawing. The chassis is shown only schematically and partially at 35 on account of its very popularity.

With variation of the loaded conditions of the vehicle, the distance between the vehicle chassis 35 and the differential gear casing 32 will be subjected naturally to modification and the upwardly directing urging pressure exerted upon the ball 28 by the longer spring arm 29a is thus altered correspondingly. Therefore, the initiating time point of the vertical fluctuating movement of the pressure control piston against the combined upwardly directing urging force provided by the springs 18 and 29 and adapted for the comencement of the hydraulic brake pressure control can be modified depending upon the loaded conditions of the rear wheels.

In the first embodiment shown in FIGS. 2 and 3, the main part of the load-sensing and instruction-transmitting spring means comprises as its main body the aforementioned spring coil 29 which is formed in turn into a spiral coil which comprises a number of coil loops as shown.

In the second embodiment shown in FIG. 4, said spring means comprises as its main body an open single spring loop 36 having longer spring arm 36a and shorter spring arm 36b. The end of the longer arm 36a is hingedly connected at 100 with the stationary arm 34 as before. The shorter spring arm 36b is bent up, so as to form an engageable hook by which the arm is supported on the top of the supporting member 33 as before.

Figure 5:
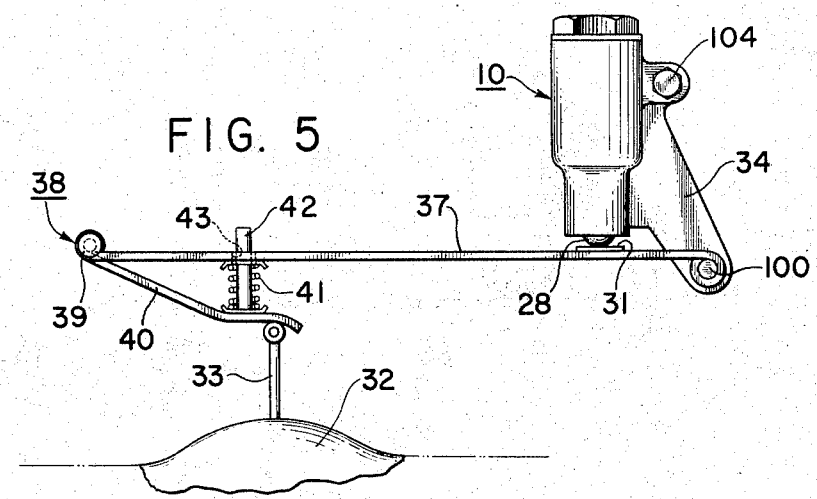
Figure 6:
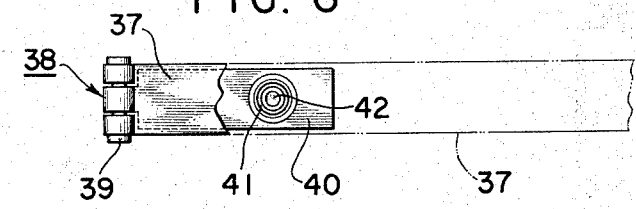
FIG. 6 is a plan view of the left hand end of the mechanism shown in FIG. 5.

In the third embodiment shown in FIGS. 5 and 6, the main part of said sensing and transmitting spring means comprises a straight spring strip 37 which is hingedly connected at its one end at 100 with the stationary arm 34 as before, while the opposite end the strip 37 is formed into a hinge 38 comprising a hinge pin 39 and pivotably connected with a short spring arm 40 which is mounted on top of the support member 33 as before. Between the main spring 37 and the shorter or auxiliary spring 40, there is provided a small coil spring 41. This spring 41 may be plural in its number when occasion desires. In order to avoid unintentional disengagement of the small coil spring 41 from position, a spring guide pin 42 may be attached to the auxiliary spring 40 and arranged to be guided in a guide opening 43 formed through the main spring 37.

The operation of the mechanism so far shown and described is as follows.

When the vehicle load is increased in the first embodiment shown in FIGS. 1 – 3, the distance between chassis 35 and rear wheel axle or differential gear casing 32 is shortened than before, and therefore the shorter spring arm 29b approaches relatively towards the longer spring arm 29a. Until both spring arms meet together, as shown by dotted lines 29', 29a' and 29b', the spring constant will be increased gradually, as shown only schematically in FIG. 7 within the operational range at a. Beyond a certain point P where said both spring arms 29a and 29b brought into physical contact as above mentioned, the spring constant of the said spring means will vary along a steeper curve P–Q lying within the second operation range b and in the first curve O–P lying within the first operation range a.

It will be clear that also in the second embodiment, a similar operational characteristic can be realized.

In the third embodiment, the auxiliary small spring 41 is compressed as the vehicle load acting upon the rear wheels increases. Until this spring 41 will have been completely compressed, the operational characteristic may be similar, as was described with reference to the first operation range a shown in FIG. 7. Thereafter, the operation will be similar to that which is encountered within the second operation range b.

In all the foregoing embodiments, said load-sensing and instruction-transmitting spring means will operate with a smaller elastic coefficient within the first operation range and then with a larger elastic coefficient within the second operation range. It will be clear that by selecting proper values of the width, thickness, length and overall configuration and the like design data which affect upon the spring constant or the elastic coefficient of the sensing and transmitting spring means, upon carrying out simpler preparatory experiments, the overall characteristics can be realized so as to meet with the occasionally adopted operational characteristics of the vehicle suspension means. More specifically, the coil configuration and turns of coil loops in addition to the spring material will affect substantially upon the desired effect in the case of the first embodiment. In the second embodiment, the wire spring 36 may be preferably replaced by a spring strip. With use of spring strip, the width, thickness and length will affect upon the desired effect, in addition to the kind and nature of the spring material.

In the third embodiment shown in FIGS. 5 and 6, the combination of data mentioned above with reference to the second and third embodiments should preferably be taken into account.

It can therefore be seen from the foregoing that according to the proposed teachings of the present invention, the load-sensing and brake pressure control initiating instruction transmitting spring means can be adapted for the realization of optimum operational performance of the hydraulic brake pressure control unit, briefly referred to "L.S.V.", in a highly simplified way. In addition, the proposed spring means are highly simple in its design and easy to replace for other. The attachment of the spring means in position may also be carried into effect in a highly simplified and easy way, as will become aware by consulting with the foregoing detailed description of the invention.

The embodiment of the invention in which an exclusive property or privilege is claimed are as follows:

1. A load-sensing and instruction-transmitting mechanism for a hydraulic pressure control unit on an automotive vehicle responsive to the load condition thereof, comprising in combination of:
   a. a cylinder housing;
   b. a stepped piston slidably arranged in said cylinder housing;
   c. a first and second hydraulic chamber defined within said cylinder housing by said piston, said first chamber being kept in hydraulic communication with a conventional motor cylinder and said second chamber being kept in hydraulic communication with conventional hydraulic wheel brake cylinder or cylinders;
   d. valve means for control of hydraulic communication between said first and second chambers responsive to actuation of said piston;
   e. a spring means having an elastic characteristic that provides an increased elastic coefficient of spring at an intermediate region over the whole spring characteristic;
   f. said spring being arranged between a wheel axle and a chassis of the vehicle adapted for keeping said valve means normally in its open state;
   g. said spring means providing in combination a smaller elastic coefficient within a predetermined first operation range and a larger elastic coefficient than the first one, within a predetermined second operation range; and
   h. said spring means comprises a first and second part of substantially flat shape, and a third part rigid with said first and second parts and formed into a coil.

2. A load-sensing and instruction-transmitting mechanism for a hydraulic pressure control unit on an automotive vehicle responsive to the load condition thereof comprising in combination:
   a. a cylinder housing;
   b. a stepped piston slidably arranged in said cylinder housing;
   c. a first and second hydraulic chamber defined within said cylinder housing by said piston, said first chamber being kept in hydraulic communication with a conventional master cylinder and said second chamber being kept in hydraulic communication with conventional hydraulic wheel brake cylinder or cylinders;
   d. valve means for control of hydraulic communication between said first and second chambers responsive to actuation of said piston;
   e. a spring means having an elastic characteristic that provides an increased elastic coefficient of spring at an intermediate region of the whole spring characteristic;
   f. said spring being arranged between a wheel axle and a chassis of the vehicle and arranged for keeping said valve means normally in its open state;
   g. said spring means providing in combination a smaller elastic coefficient within a predetermined first operation range and a larger elastic coefficient than the first one, within a predetermined second operation range; and
   h. said spring means comprises a first and second part of substantially flat shape, and a third part rigid with said first and second parts and formed into a coil.

3. The mechanism as claimed in claim 2, wherein said first spring part comprises a longer spring arm cooperating with said unit, said third spring part extends from said longer spring arm, and said second spring part comprises a shorter spring arm than said longer arm and extending from said third spring part, said shorter arm being disposed on rear wheel axle means of said vehicle.

4. The mechanism as claimed in claim 3, wherein said spring coil is a single and open spring loop.

5. The mechanism as claimed in claim 2, wherein said smaller elastic coefficient within a predetermined first operation range is attained by said first, second and third spring parts, and said larger elastic coefficient within a predetermined second operation range is attained by said first spring part.

* * * * *